United States Patent [19]

Diethert et al.

[11] Patent Number: 5,325,036

[45] Date of Patent: Jun. 28, 1994

[54] ELEVATOR SPEED SENSORLESS VARIABLE VOLTAGE VARIABLE FREQUENCY INDUCTION MOTOR DRIVE

[75] Inventors: Andreas J. Diethert, Berlin, Fed. Rep. of Germany; Claudia M. Schmidt-Milkau, Simsbury, Conn.

[73] Assignee: Otis Elevator Company, Farmington, Conn.

[21] Appl. No.: 898,261

[22] Filed: Jun. 15, 1992

[51] Int. Cl.$^5$ ............... B66B 1/30; H02P 5/40
[52] U.S. Cl. .................. 318/802; 318/807; 187/116; 187/119
[58] Field of Search ............... 187/119, 111, 115, 116, 187/112, 118; 318/807, 803, 805, 808, 811, 802

[56] References Cited

U.S. PATENT DOCUMENTS

| | | | |
|---|---|---|---|
| 3,619,750 | 11/1971 | Mokrytzki | 318/798 |
| 4,418,308 | 11/1983 | Bose | 318/803 |
| 4,726,450 | 2/1988 | Fossati et al. | 187/111 |
| 4,751,984 | 6/1988 | Williams et al. | 187/116 |
| 4,958,117 | 9/1990 | Kerkman et al. | 318/805 |
| 4,982,816 | 1/1991 | Doi et al. | 318/803 |
| 5,035,301 | 7/1991 | Skalski | 187/118 |

Primary Examiner—William M. Shoop, Jr.
Assistant Examiner—John W. Cabeca
Attorney, Agent, or Firm—Breffni X. Baggot

[57] ABSTRACT

During motor jerk-out, the real component of a stator current ReI is measured as an approximation to torque current $I_T$, and a reference acceleration $A_{ref}$ is obtained as an approximation to the motor acceleration, for providing, by means of linear regression, the Y intercept of a line defining the relationship between ReI and $A_{ref}$, which intercept defines ReI at a constant high speed (ReI$_{CONSTANT\ HIGH\ SPEED}$) for linearly relating ReI$_{CONSTANT\ HIGH\ SPEED}$ to a compensation frequency $f_{comp}$, which is provided to a summer for summing $f_{comp}$ with a reference frequency $f_{ref}$ used for dictating motor speed. The stator current I and $A_{ref}$ are sampled during jerk-out when the motor is at high speed because there the real component of the stator current ReI is approximately equal to $I_T$.

3 Claims, 7 Drawing Sheets

ELEVATOR SPEED SENSORLESS VARIABLE VOLTAGE VARIABLE FREQUENCY INDUCTION MOTOR DRIVE

TECHNICAL FIELD

This invention relates to a variable voltage variable frequency induction motor drive without speed feedback for an elevator.

BACKGROUND OF THE INVENTION

Variable speed induction motor drives using static inverters are widely used. When dynamic performance is not important, the speed of the motor drive is simply adjusted by changing the frequency of the input while keeping the voltage-hertz ratio constant. There are situations, however, requiring fast response, for instance, in servo-applications. Then, feedback from speed information from the rotating shaft of the machine is usually required. Such feedback is part of a closed loop for control, or it may be part of the torque control algorithm for the determination of the slip frequency (or simply slip) of the motor excitation. In such instances, a tachometer or a high-resolution encoder is typically mounted on the motor shaft in order to provide such feedback. Often, however, the output of a tach includes ripples and a special tachometer which eliminates ripple must be used if the ripple is unacceptable. Such a tachometer is described in U.S. Pat. No. 4,520,300 "Brushless Ultra-efficient Regenerative Servomechanism."

High performance speed control, where it is uneconomical or impractical to have a shaft mounted transducer is desirable. This is the case with linear motor driven transportation systems or with steel mill drives because transducer cabling is undesirable in an environment which is inhospitable around the motor. It is also the case with retrofit applications where an existing induction motor having no shaft transducer installed needs to be speed controlled. Operating a motor without speed feedback can, however, result in motor tilling. That is, as the motor nears its stopping point and a given creeping speed is desired to be commanded for the motor, too low a creep speed is commanded, because the actual speed of the motor is not known, and the motor passes its destination and reverses its direction to go back to its correct stop position.

Speed sensorless induction motor control is known. See, for example, U.S. Pat. No. 4,009,427 by Takahashi and U.S. Pat. Nos. 4,530,376 and 4,680,526, both by Okuyama, and "Speed Compensation Motor Circuit Utilizing Real Current Component" U.S. Pat. Np. 3,619,750.

Model reference adaptive control has been described in "Adaptive Control—The Mono-Reference Approach" by Yoan D. Landau, published by Marcel Dekker, Inc., New York 1979. It is known to identify the speed of an inverter-fed induction motor by the technique of model reference adaptive control See, for example, "Speed Sensorless Vector Control of Induction Motor with Mono-Reference Adaptive System" by Shinzo Tamai, Hidehiko Sugimoto, and Masao Yano, on pages 189-195, a paper print presented at an IEEE Conference in Atlanta, Georgia on 18-23 October 1987, IA Vol. 1.

Other articles of interest are: (1) "Observers for Flux Estimation in Induction Machines" by George C. Verghese and Seth R. Sanders, IEEE trans. *Industrial Electronics,* Vol. 35, No. 1, for Feb. 1988, pages 85-94; (2) "Vector Control System for induction Motor using a Sepped Estimation Based on Instantaneous Slip Frequency Principles", by Hirotami Nakano, Shinichi Horie, Tsuyoshi Matsuo, and Kohji Iwata, pages 95-103, *Electrical Engineering in Japan,* Vol. 107, No. 4, 1987.

Another speed sensorless system is shown in "Tacholess Vector Control Adaptive System from Motor Drive" by Schauder, U.S. Pat. No. 4,862,054, which shows a reference model based on the model equation of asynchronous motor combined with an adjustable model responsive to the direct in quadrature components of the current and to an estimated speed. An adaptive mechanism counting in a P-I amplifier expands to the direct deviation between the direct in quadrature components and generates a feedback signal representing the estimated speed. The adjustable model reacts to the estimated speed signal.

Japanese Application No. 57-71295, "Speed Control for Induction Motor", shows a speed control without a speed detector by employing a double control loop with a slip angular frequency arithmetic unit and an overshoot and prevention circuit as a feedback system for speed controlling and frequency controlling amplifiers. And, Japanese Application No. 57-142188 "Controlling Device for Commutatorless Motor", shows a controlling device for a highly efficient commutatorless motor without necessity of a speed detector by controlling the prescribed gamma constantly by using a synchronizing signal from a distributor without producing an actual speed signal. And, Japanese Application No. 1-114394, "High-performance Speed Controlling Circuit for Multiphase Induction Motor based on Detection of Only Current" shows an industrial motor control without a speed detecting device, by detecting motor current only and by computing the slip angle speed of the space vector of magnetic flux.

Still another speed sensorless drive, "Speed Control System for Elevators", U.S. Pat. No. 4,982,816 shows an elevator with an induction motor drive wherein A. the output torque is determined by direct current of an inverter, B. slip frequency is determined from the torque, C. the gap between an open-loop dictated speed pattern and the actual speed is compensated by the slip calculated during acceleration and again during constant speed movement so that the open-loop control may be improved in terms of stop position precision.

DISCLOSURE OF THE INVENTION

The goals of the present invention are to minimize speed error in the creep region of an elevator motor by estimating slip (the creep region is the constant speed region of a motor immediately prior to its stop point, where fine positioning of the elevator near a floor is important), provide enough motor torque to prevent motor tilling, and position accurately the motor near its stopping point without using a speed sensor.

The basis of the present invention is the observation that in an induction motor:

(a) reference frequency $f_{ref}$, which is proportional to a reference speed, is desired to be equal to motor speed;

(b) slip is proportional to torque current $I_T$;

(c) the relationship between $I_T$ and acceleration may be described by a linear equation:

$$I_T = I_{T,CONSTANT\ HIGH\ SPEED} + k^* acceleration \quad \text{(equation 1)}$$

(d) at high motor speeds, when the angle between the stator voltage and stator flux is nearly 90 degrees, the real component of the stator current is approximately equal to the torque current $I_T I_T \approx Re\, I$, where I is the stator current.

Because $f_{ref}$ is not equal to the motor speed in actuality, $$f_{ref} + f_{comp} = f + \text{slip frequency} \quad \text{(equation 2)}$$

where $f_{comp}$ is a compensation frequency for minimizing speed error between the speed commanded by the reference frequency and the speed of an elevator; f=stator frequency—slip frequency and is therefore proportional to the speed of the elevator.

Because slip frequency (or simply slip) is proportional to $I_T$ and $f_{comp}$ is proportional to slip, then $f_{comp}$ is proportional to $I_T$. Finally, because A. $I_T$ is related to acceleration (equation 1 above), $I_T$ can be determined during jerk-out and B. the relationship between $I_T$ and $f_{comp}$ can be determined on a calibration run.

According to the present invention, during motor jerk-out, the real component of a stator current ReI is measured as an approximation to torque current $I_T$, and a reference acceleration $A_{ref}$ is obtained as an approximation to the motor acceleration, for providing, by means of linear regression, the Y intercept of a line defining the relationship between ReI and $A_{ref}$, which intercept defines ReI at a constant high speed (ReI$_{CONSTANT\ HIGH\ SPEED}$) for linearly relating ReI at a constant high speed to a compensation frequency $f_{comp}$, which is provided to a summer for summing $f_{comp}$ with a reference frequency $f_{ref}$ used for dictating motor speed. The stator current I and $A_{ref}$ are sampled during jerk-out when the motor is at high speed because there the real component of the stator current ReI is approximately equal to $I_T$.

The present invention has these advantages:

(a) cost savings of a motor drive with no speed sensor;

(b) speed error compensation in a drive in which a speed sensor cannot be retrofitted;

(c) avoidance of stabilization problems contributed to by ripple in the output of a speed sensor;

(d) providing enough motor torque (since slip frequency is proportional to torque) to prevent motor tilling;

(e) position accuracy near the motor stopping point without using a speed sensor;

(f) reduce the time for the motor to complete a run from start to finish by reducing the creep time of the motor, i.e. the time that the motor is running at creep speed; and (g) the above advantages regardless of whether the motor achieves and maintains a high constant speed.

BEST MODE EMBODIMENT OF THE INVENTION

Figure 1:
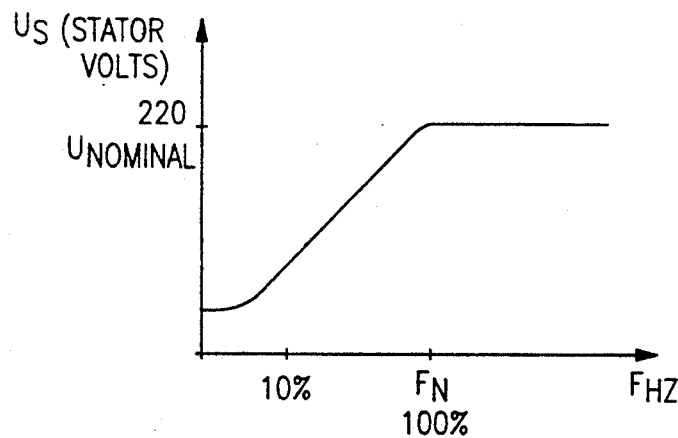
FIG. 1 is a plot of stator voltage $U_S$ v. inverter input frequency, f.
Figure 2:
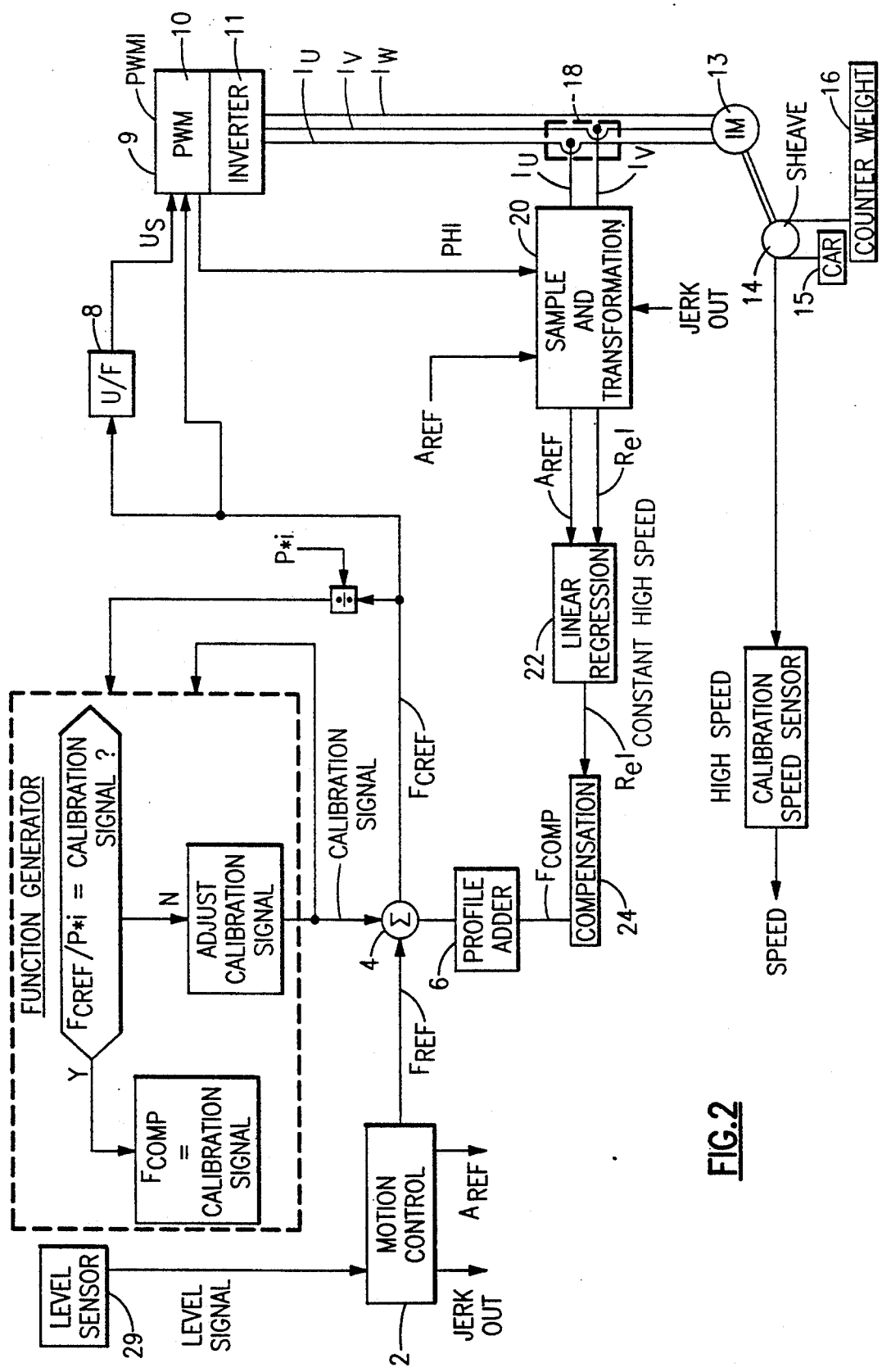
FIG. 2 is a block diagram of the present invention.

FIG. 1 is a graph of inverter input frequency f v. stator voltage, $U_S$, for a variable voltage variable frequency induction motor (VVFIM) connected to a sheave (FIG. 2) for moving a car (FIG. 2) and counterweight (FIG. 2).

After f reaches about 10% of the nominal inverter input frequency $F_n$, the relationship between f and the stator voltage, $U_S$, is linear. The principle of a VVVFIM is that one can easily alter speed of an induction motor (IM) by varying f so long as $U_S/f$ is maintained constant. Where th VVVFIM turns a sheave of a geared elevator, the speed of VVVFIM is related to f by the following equation:

$$\text{speed}\ (m/s) = 2\pi \frac{r}{i} \cdot \frac{F}{P}$$

where
r is the radius of the sheave
i is the gear ratio and
2*P is the number of poles.

The advantage of a variable voltage variable frequency (VVVF) controlled IM is that the IM can be controlled as easily as a DC machine.

However, varying f does not always result in a proportionate change in motor speed because there may be a speed error—a difference between F and the speed of the car. The goal of the present invention is to compensate for this difference—without a speed sensor—where it is necessary to ensure sufficient motor torque and position accuracy by using a compensation frequency $f_{comp}$.

Therefore, to botain $f_{comp}$, two things must be done:

(a) the relationship between torque current $I_T$ and acceleration must be determined to find torque current at constant high speed $I_T, CONSTANT\ HIGH\ SPEED$, and (b) the relationship between torque current at constant high speed $I_T, CONSTANT\ HIGH\ SPEED$ and compensation frequency $f_{comp}$ must be learned.

(A) Relationship between $I_T$ and Acceleration

The torque current $I_T$ is not obtained directly but it may be obtained approximately by measuring the real component of the stator current when the angle between the stator voltage and flux is nearly 90 degrees.

FIG. 2 is a block diagram illustrating the invention. A motion control 2 provides a reference stator frequency $f_{ref}$ to a summer 4 where $f_{ref}$ is added to a compensation frequency $f_{comp}$, which has a non-zero value until it is provided by a profile adder 6 at the end of motor jerk-out. From the summer 4, a compensated referency stator frequency $f_{cref}$ is applied to a frequency to voltage converter u/f 8 where a compensated stator frequency input $f_{cref}$ determines a stator voltage output Us. The compensated reference frequency $f_{cref}$ is also applied to a pulse width modulation inverter (PWMI) 9 including a pulse-width-modulator (PWM) 12 and an inverter 11. The transfer function of the frequency to voltage converter u/f is shown in FIG. 1. The frequency to voltage converter u/f 8 provides the stator voltage Us to the PWMI 9.

The PWMI 9 provides an angle phi. The angle phi may be obtained by integrating the stator frequency $f_{ref}$ to the inverter 11 with respect to time. This gives a reference angle phi, but not the actual angle. The actual angle phi is the angle that the stator voltage $U_S$ makes with the real axis as $U_S$ rotates at a speed $\omega t$, where $\omega$ is the angular frequency of rotation. A reference angle phi, rather than the actual angle phi, is obtained this way because it is obtained by integrating a reference value—the reference stator frequency $f_{ref}$.

The actual angle phi may be calculated as the sum of an original angle $\phi_o$ and a differential angle $\Delta\phi$, where $$\Delta\phi = \frac{f_{cref} * 360 \text{ degrees}}{2 * \text{switching frequency of the inverter}}.$$

The original angle $\phi$ is the angle $\phi$ during the last control cycle of the inverter 11; one control cycle of the inverter 11 is equal to 1/(switching frequency of the inverter). When the motor is starting this angle $\phi$ is zero.

The PWMI 9 also provides three inverter output currents Iu, Iv, Iw stator currents to an IM 13 which can turn a sheave 14 and move a car 15 and a couterweight 16.

Two current sensors 18 measure two inverter output currents Iu, Iv, and provide them to a sample and transformation means 20. The angle phi is also provided to the sample and transformation means 20. An acceleration reference $A_{ref}$ is provided by the motion control 2 to the sample and transformation means 20. $A_{ref}$ can also by provided by sampling and differentiating $f_{cref}$ with respect to time. The sample and transformation means 20 samples two inverter output currents Iu, Iv. The sample and transformation means 20 samples functions in response to a jerk-out signal provided by the motion control 2 at the beginning of the first jerk-out segment C (FIGS. 3 and 4) 8 and ceases sampling in response to a no jerk-out signal at the end of that jerk-out region.

The sample and transformation means 20 provides $A_{ref}$ and the real component of the stator current ReI to a linear regression means 22. The linear regression means 22 calculates an equation of a line relating $A_{ref}$ and ReI in the form y=mx+b, where b is the y intercept of that line, and physically represents $ReI_{CONSTANT\ HIGH\ SPEED}$, the real component of the stator current ReI at a high constant motor speed (represented by point "d" on FIGS. 3 and 4). $ReI_{CONSTANT\ HIGH\ SPEED}$ is provided to a compensation means 24. The relationship between $ReI_{CONSTANT\ HIGH\ SPEED}$ and the compensation frequency $f_{comp}$ may be described by a linear equation. The compensation means 24 provides a compensation frequency $f_{comp}$ to the profile adder 6, where a profile is provided by the motion control 2 for smoothly adding the compensation frequency $f_{comp}$ to the reference frequency $f_{ref}$ at the summer 4.

Figure 3:
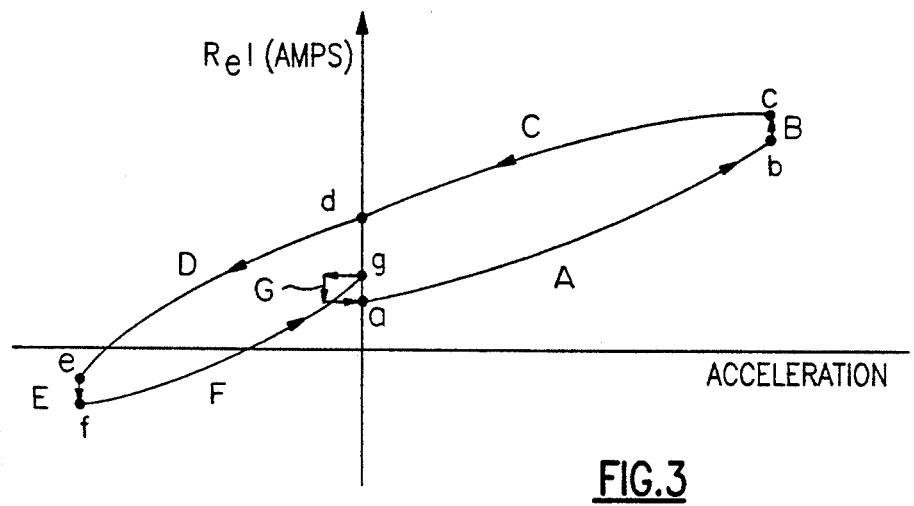
FIG. 3 is a plot of torque current $I_T$ v. reference acceleration $A_{ref}$.

FIG. 3 is a graph of torque current $I_T$ v. $A_{ref}$, reference acceleration. Relating movement of the IM 13 to the graph, the IM 13 is at standstill at a point "a". The standstill point "a" represents both the beginning and ending point for a motor run. The vertical axis of FIG. 3 is the torque current $I_T$, which is approximately equal to the real component of the stator current ReI when the IM 13 is running at high speeds. Torque current $I_T$ is, in turn, proportional to slip. When the IM 13 begins moving, jerk is a positive constant value, the IM 13 accelerates along segment A until point "b" is reached. The torque current $I_T$ at point "a" is the value required to balance the car 15 with the counterweight 16.

Segment A is known as jerk-in because a positive jerk is applied to the IM 13. The IM 13 reaches maximum acceleration at point "b". The difference is torque current $I_T$ between point "b" and point "a" is the torque current $I_T$ responsible for acceleration torque plus torque current $I_T$ responsible for friction torque. Acceleration torque is the torque required to accelerate the IM 13. Friction torque is the torque applied to the IM 13 to overcome friction.

The IM 13 then constantly accelerates between points "b" and "c" along segment B, at maximum acceleration. During this time, jerk is zero. In response to a negative jerk applied when the IM 13 is at point "c", the IM 13 accelerates at a lower rate in a segment C, called jerk-out because the IM 13 experiences a negative jerk there. The difference is torque current $I_T$ between "b" and "c" is the torque current $I_T$ required to overcome additional friction because the speed of the motor increases between "b" and "c". So long as there is speed in the IM 13, there is friction torque.

At point "d", the IM 13 moves at constant speed and therefore experiences zero jerk. A constant speed point "d" is shown on the graph of FIG. 3 here, but it is not necessarily true that a motor will always move at a constant speed during a velocity profile. Point "d" marks the point at which the car 15 is positioned approximately halfway between the beginning and ending points "a" and a velocity profile of the car.

The IM 13 leaves point "d" and experiences a negative jerk on segment D as it decelerates to point "e". Between points "e" and "f" on segment E, the IM 13 moves at constant acceleration while the torque current $I_T$ decreases. The jerk is zero. The torque current $I_T$ between points "d" and "e" decreases in order to decelerate the IM 13 and overcome gradually less friction. when the IM 13 again experiences jerk-in, the IM 13 moves from point "f" to point "g" along segment F as the acceleration $A_{ref}$ becomes less negative. The current torque $I_T$ between points "f" and "g" represents the current torque $I_T$ required to overcome friction and decrease acceleration of the IM 13.

From point "g", the acceleration decreases suddenly, then remains constant, and finally turns positive until the stopping point is reached at point "a". The difference in current torque $I_T$ between points on segment G represents the current torque $I_T$ required to reduce friction encountered by the IM 13 from the friction as the car 15 moves from creep speed to standstill.

As can be seen from FIG. 3, segments A and F are concave up slightly, and segments C and E are concave down slightly. The cause of the nonlinearity is that the relationship between friction in the IM 13 (and the torque required to overcome it) and acceleration is nonlinear, although friction is linear with respect to speed. In addition, the behavior of the IM 13 is nonlinear. Accordingly, the amount of curve depends on the amount of friction in the motor drive system, especially in the gears turned by the IM 13; if the friction in the selected motor drive is low, segments A, F, C, and E will be even more nearly linear than in FIG. 3. For the purposes of the invention, segment "C" is considered to be a straight line.

Figure 4:
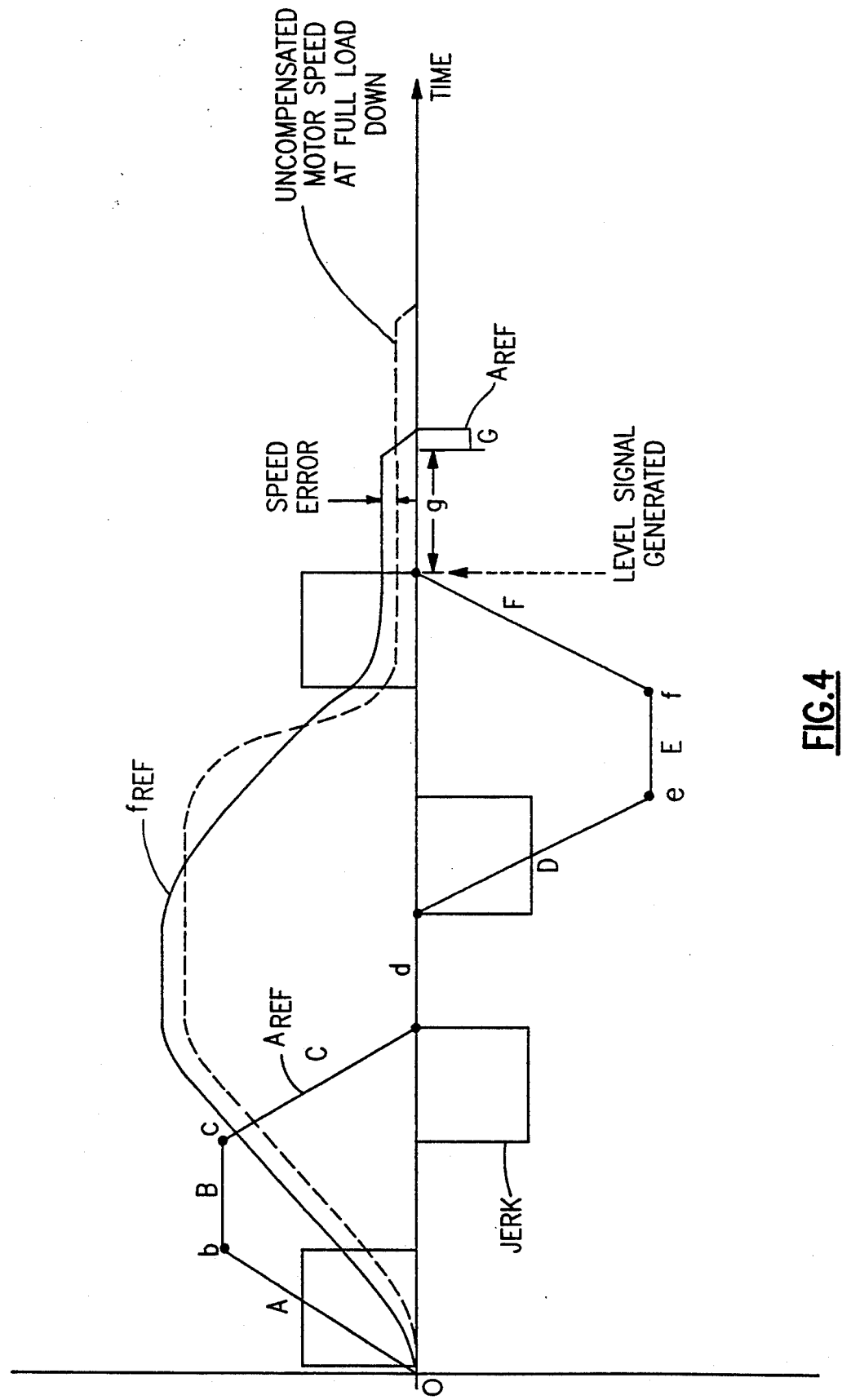
FIG. 4 is a plot of reference acceleration $A_{ref}$, reference frequency $f_{ref}$, jerk, and actual speed v. time at full motor load.

FIG. 4 is a graph of time v. speed reference $f_{ref}$, acceleration reference $A_{ref}$ (m/sec2), jerk (m/sec3), and actual speed (m/sec). The points (a-g) and segments (A-G) correspond to the points and segments on the graph of FIG. 4. The IM 13 starts from zero speed during segment A, begins moving, and experiences a jerk and an acceleration until the IM 13 reaches point "b". During segment B, speed continues to increase, the acceleration is constant, at a maximum and the jerk is zero. During segment C, the speed continues to increase but the acceleration is decreasing and the jerk is negative. This is the second jerk-out because it is the second instance of negative jerk. At "d", the speed is constant, the acceleration is zero, and the jerk is zero. During segment D, the jerk is negative, the speed is decreasing, and the acceleration is decreasing. This is the first jerk-out of the motor run because it is the first instance of negative jerk during the motor run. During segment E, the speed is decreasing, the acceleration is at a negative maximum, and the jerk is zero. During segment F, the speed is decreasing, the acceleration is increasing, and the jerk is positive. At point "g", the IM 13 moves at a constant creep speed until a level signal is received by the motion control 2, at which point the IM 13 speed begins ramping down to zero in segment G. After the level signal is received by the motion control 2, the acceleration $A_{ref}$ is negative for the purpose of stopping the IM 13.

In FIG. 4 the actual speed for a fully loaded IM 13 is shown. The actual speed differs from the reference speed $f_{ref}$ in that (a) there is a speed error during the creep region, and (b) the level signal is provided much later for the actual speed than for the reference speed, and creep time (the time during which the car 15 is moving at creep speed) is longer.

Figure 5:
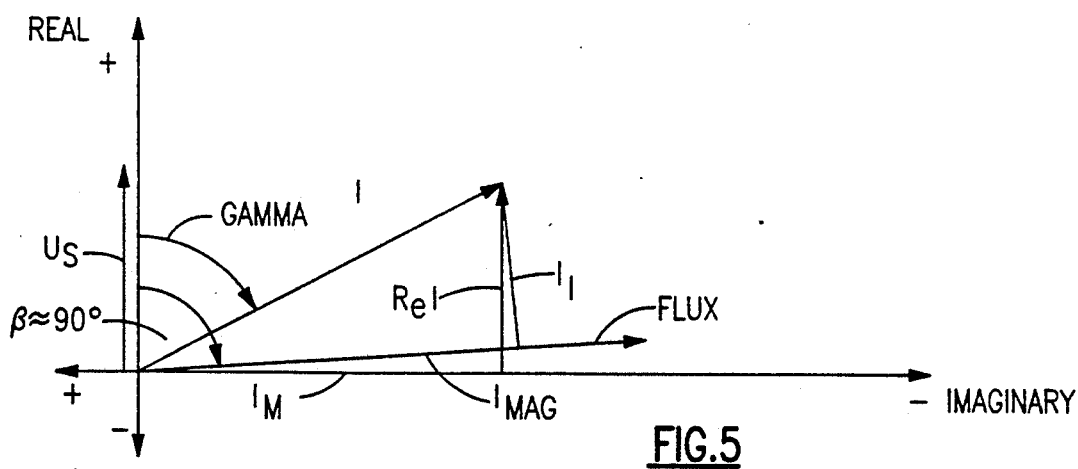
FIG. 5 is a vector diagram of stator voltage $U_S$, torque current, $I_T$ stator current I, and flux.

FIG. 5 shows a stator current I vector, a flux vector, torque current $I_T$ and magnetization current $I_{mag}$ for a variable voltage variable frequency induction motor (VVVFIM) VVVFIM. The coordinate system is a synchronous reference frame, meaning that the stator voltage ($U_s$) always lies on the real axis and the coordinate system rotates with a frequency $\omega$. The angle gamma between the stator voltage $U_s$ and stator current I does not depend on whether the reference frame of FIG. 4 rotates in synchronism with the frequency of the stator voltage ($U_s$) or whether it is fixed. The stator current I is the vector sum of a magnetization current $I_{mag}$ and the torque current $I_T$. FIG. 4 represents the stator current I when the IM 13 is running at high speed and the angle between the flux and stator voltage $U_s$ is nearly 90 degrees such that the real component (ReI) of the stator current I is nearly equal the torque current $I_T$. Given that, and the fact that the torque current $I_T$ cannot be measured directly, the torque current $I_T$ can be measured approximately by measuring the real component (ReI) of the stator current I.

Figure 6:
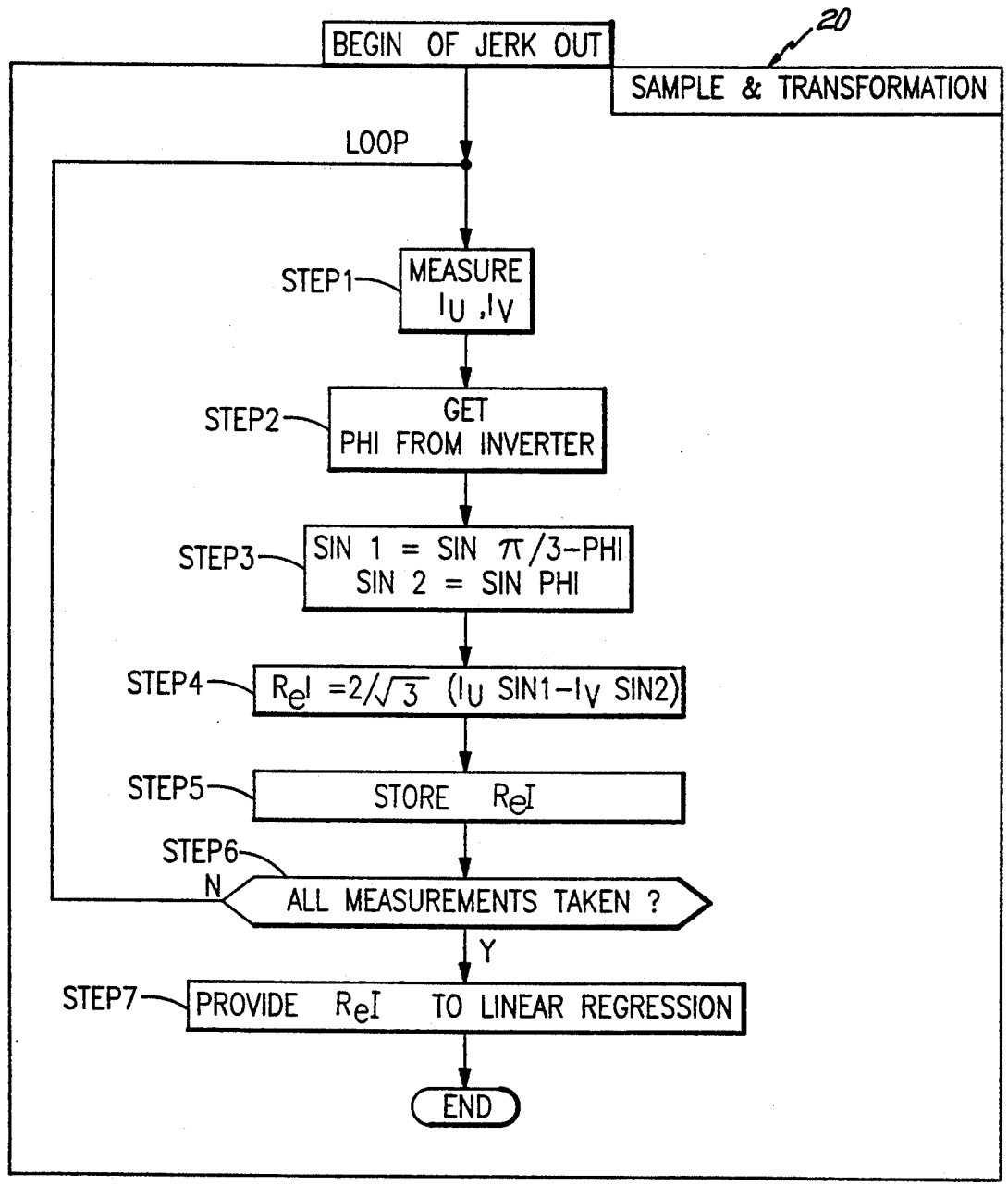
FIG. 6 is a flow chart for the sampling and transformation means shown in FIG. 5.

FIG. 6 is a flow chart of the sample and transformation means 20. FIG. 6 shows a loop. The number of iterations of the loop equals the number of times Iu, Iv, and phi are sampled and also the number of values of ReI provided to the linear regression means 22. Iu, Iv are measured (step 1), the angle phi obtained from the PWNI 9 (step 2). The two values sin 1 = sin(phi/3 − phi) and sin 2 = sin(phi) are obtained from a lookup table (step 3). In step 4, the real component of the stator current, ReI is calculated:

$$ReI = \frac{2}{\sqrt{3}} (I_u \sin 1 - I_v \sin 2)$$

For each iteration of the loop, Iu, Iv and phi are sampled and a value of ReI is obtained and stored (step 5) until all calculated values of ReI are provided to the linear regression means 22 (step 7). Then, $f_{comp}$ is added to $f_{ref}$ smoothly at point "d" of FIG. 2 in the profile adder 6 to provide the compensated reference frequency $f_{cfef}$.

Figure 7:
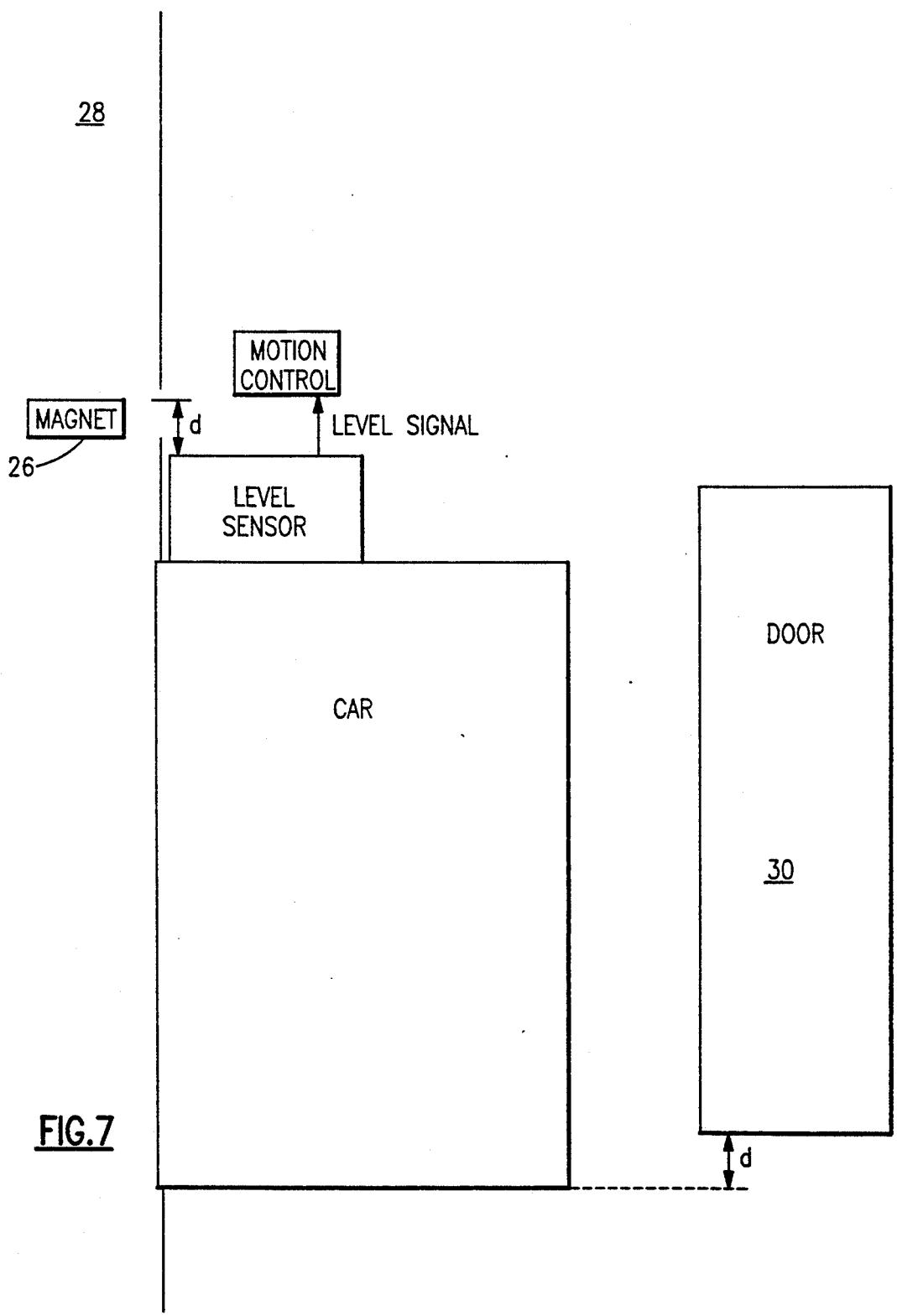
FIG. 7 shows a leveling sensor mounted on a car.

In FIG. 7, a magnet 26 on a hoistway wall 28 is sensed by a level sensor 29 and a level signal provided to the motion control 2 to indicate that the car 15 is at the creep zone and the motion control 2 should provide the value of $f_{ref}$ corresponding to a creep speed value so that the car 15 can level with the door 30.

(B) Relationship between $I_{T,CONSTANT\ HIGH\ SPEED}$ and $f_{comp}$.

The measurement of ReI is done at a high speed. But it is necessary to compensate at creep speed in order to provide the proper motor torque at creep speed, accurately position the motor near its stopping point, and compensate for speed error in the creep region. Therefore, a relation between $f_{comp}$ at creep speed and the measured $ReI_{CONSTANT\ HIGH\ SPEED}$ is needed. This is learned by carrying out a calibration scheme.

If instead of a relation between $f_{comp}$ at creep speed and the measured $ReI_{CONSTANT\ HIGH\ SPEED}$, a relation between $f_{comp}$ at creep speed and $I_T$ where used to generate $f_{comp}$, the value for $f_{comp}$ would include error due to the fact that $I_T$ is not provided by the linear regression means 22 using measured current values $I_u$, $I_v$. Providing $f_{comp}$ from a relation between $f_{comp}$ at creep speed and the measured $ReI_{CONSTANT\ HIGH\ SPEED}$ rather than a relation between $f_{comp}$ at high speed and $ReI_{CONSTANT\ HIGH\ SPEED}$ ensures that the motor torque provided at creep speed will not include the larger friction torque found at high motor speeds. The calibration run also corrects the difference between the friction at point "d" (FIG. 3) and that at point "g" (FIG. 3). This is important because the torque current at constant speed obtained as a result of the linear regression is not the same value as that for low speed. In addition, generating $f_{comp}$ through the calibration run accounts for constant errors and load proportional errors in the measured current.

Figure 8:
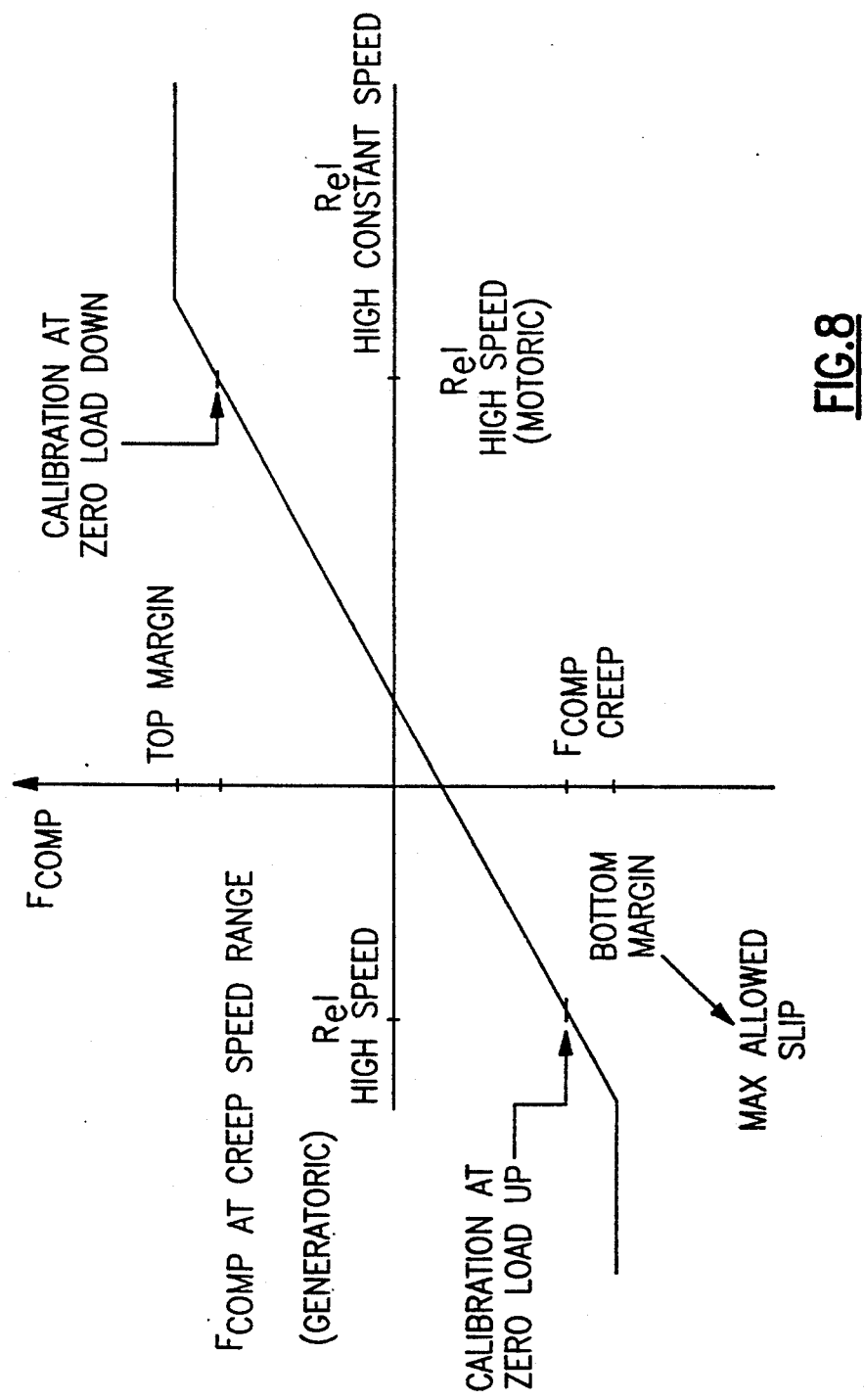
FIG. 8 shows torque current $I_T$ at creep speed $f_{comp}$ v. $I_T, CONSTANT\ HIGH\ SPEED$.

The relationship between $I_{CONSTANT\ HIGH\ SPEED}$ and compensation frequency $f_{comp}$ is obtained on four calibration runs, two to obtain two $ReI_{CONSTANT\ HIGH\ SPEED}$ values of waveform 1 of FIG. 8, and two to obtain two $f_{comp}$ values (FIG. 8). The two runs to obtain $f_{comp}$ values are made with $f_{comp}$ initially set to zero and the IM 13 running at creep speed because it is the creep speed error that is desired to be eliminated. FIG. 8 shows $f_{comp}$ v. $ReI_{CONSTANT\ HIGH\ SPEED}$. The top and bottom margins are the maximum allowed slip.

The two runs to obtain high speed values are made with the IM 13 running at high speed because that is the speed the IM 13 will be running at when ReI is determined during jerk-out. On the first calibration run, the IM 13 is run with no load at creep speed with the car 15 moving in the down direction to get the $f_{comp}$ for motoric conditions. On the second run, the IM 13 is run with the car 15 moving in the up direction to get the $f_{comp}$ for generatoric conditions. Moving the car 15 down is a motoric condition because the counterweight 16 is heavier than the car 15 with no load in it. Moving the car 15 up is a generatoric condition for a similar reason. These two runs consist of moving the car 15 and counting the number of sheave revolutions per unit time. If this number differs from $f_{ref}$, with $f_{comp}$ set to zero, then a calibration signal from a function generator is provided to the summer 4 and adjusted until the number of sheave revolutions per unit time equals $f_{cref}/(P*i)$. On the third calibration run, the IM 13 is run at high speed down to get $ReI_{CONSTANT\ HIGH\ SPEED}$ for motoric conditions. On the fourth run, the IM 13 is run up at high speed to get the $ReI_{CONSTANT\ HIGH\ SPEED}$ for generatoric conditions. When no more adjustment to the value of the calibration signal are needed to make it equal to $f_{cref}/(P*i)$, that value of the calibration signal is equal to $f_{comp}$.

Figure 9:
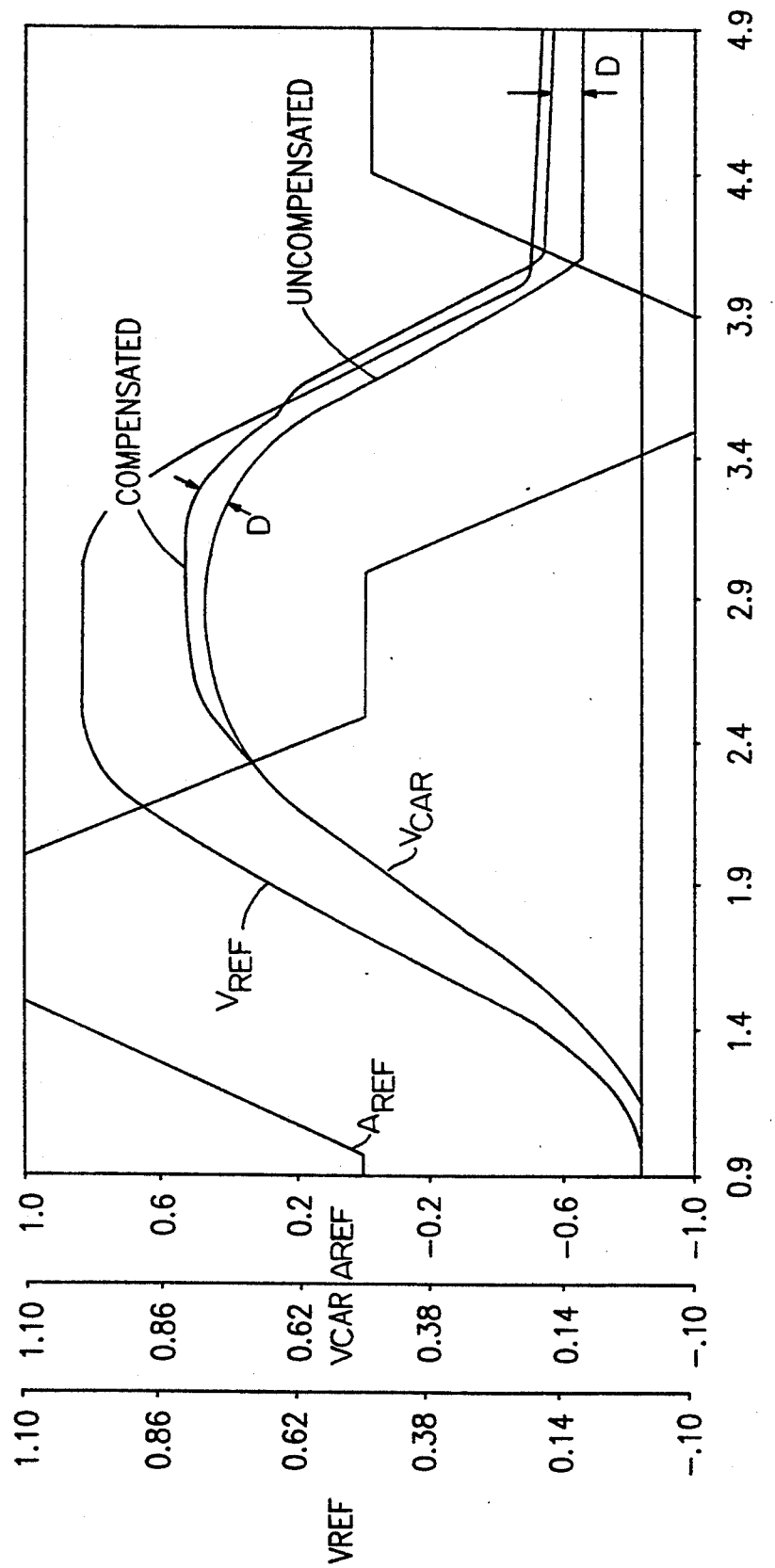
FIG. 9 shows acceleration $A_{ref}$, reference stator frequency $f_{ref}$, and actual motor speed v. time where $f_{comp}$ is summed with $f_{ref}$ and where $f_{comp}$ is not summed with $f_{ref}$.

FIG. 9 shows $A_{ref}$, $V_{car}$ (the velocity of the elevator car which is proportional to $f_{cref}$) and $V_{ref}$ (the dictated velocity which is proportional to $f_{cref}$) with and without compensation. The difference D between $V_{car}$ and $V_{ref}$ is constant from the time $f_{comp}$ is applied until the end of the creep region except for when $f_{comp}$ is first added smoothly to $f_{ref}$.

It should be understood by those skilled in the art that various changes, omissions, and additions may be made herein without departing from the spirity and scope of the invention.

We claim:

1. In an open loop three phase asynchronous elevator motor drive response to a reference frequency, a method of compensating for a difference between dictated motor speed proportional to said reference frequency and actual motor speed, comprising:
   providing samples of a reference acceleration during a portion of a run of an elevator motor when jerk is nonzero;
   providing corresponding samples of the real component of a stator current;
   obtaining a high constant speed value of the motor in response to the real component of the stator current and said reference acceleration; and
   providing a compensation frequency which is a function of the constant speed value including
   (a) moving the motor in a first direction with no load on the motor, while said reference frequency is set to a creep value and said compensation frequency is zero, summing a calibration signal with said reference frequency and providing and providing an initial motoric calibration compensation frequency and adjusting the magnitude of said calibration signal until said initial motoric calibration compensation frequency is proportional to the motor speed and providing a motoric calibration compensation frequency signal;
   (b) moving the motor in a second direction with no load on the motor, while said reference frequency is set to a creep value and said compensation frequency is zero, summing a calibration signal with said referency frequency and providing an initial generatoric calibration compensation frequency and adjusting the magnitude of said calibration signal until said initial generatoric calibration compensation frequency is proportional to the motor speed and providing a generatoric calibration compensation frequency signal;
   (c) moving the motor in said first direction with no load on the motor, while said reference frequency is set to a high speed value, and measuring a first high constant value of the real component of the stator current for a motoric condition;
   (d) moving the motor in said second direction with no load on the motor, while said reference frequency is set to a high speed value and measuring a second high constant value of the real component of the stator current for a generatoric condition;
   (e) providing a compensation frequency in response to said first and second high constant speed values, said motoric calibration compensation frequency signal and said generatoric calibration compensation frequency signal; and
   adding said compensation frequency to said reference frequency.

2. The method of claim 1, wherein said real component of the stator current ReI is measured by measuring two stator currents $I_u$, $I_v$, measuring an angle phi between a stator flux and stator voltage, calculating two values sin 1 = sin(phi/3 − phi), and calculating the real component of the stator current, according to the equation:

$$ReI = \frac{2}{\sqrt{3}}(I_u \sin 1 - I_v \sin 2).$$

3. The method of claim 1, wherein said compensation frequency is added at the end of a first jerk out of the elevator motor run.

* * * * *